June 23, 1936. M. M. KENNEALLY 2,045,150

TRANSMISSION LINE SUPPORT

Filed March 12, 1934 2 Sheets-Sheet 1

Inventor
MARTIN M. KENNEALLY

By
Attorney

Inventor
MARTIN M. KENNEALLY

By
Attorney

Patented June 23, 1936

2,045,150

UNITED STATES PATENT OFFICE 2,045,150

TRANSMISSION LINE SUPPORT

Martin M. Kenneally, Mansfield, Ohio, assignor to The Ohio Brass Company, Mansfield, Ohio, a corporation of New Jersey Application March 12, 1934, Serial No. 715,170

3 Claims. (Cl. 189—33)

My invention relates to structures for supporting the conductors of transmission lines and particularly lines carrying high voltages.

One object of my invention is to provide a structure having cross arms pivotally mounted at their ends whereby the arms will automatically pivot about their longitudinal horizontal axes in case of the unbalancing of the line on either side of the arm to which it is attached and especially in case the line should break.

Another object is to reduce the torsional stress in the arm and upon the supporting towers therefor in case the line should break on either side of the arm.

Many structures for supporting transmission lines have the projecting cross arms rigidly secured to the tower and in such cases if the line should break the tendency will be for the line on the unbroken side to materially increase the stress on the cross arm in the direction of the unbroken span and to rotate or twist the tower about its vertical axis. This requires the towers and arms to be made very much heavier than would otherwise be required in order to meet the increased strains which may be brought upon the arms and towers and heavier construction means increased cost.

The normal stress upon any cross arm and tower is vertical and so long as the load remains vertical a tower of reasonably light construction would be all that is required and the arms may be so constructed as to have greater strength vertically than horizontally.

Transmission lines may be supported on structures having wood or steel masts or towers and the cross arms in either case may be either of wood or steel.

There is an advantage in having the cross arm of wood in case the tower or mast is of either steel or wood as it adds materially to the insulation between conductor and ground and it is therefore desirable to relieve all abnormal torsional and bending stresses in the arms as far as possible in case of breakage of the line.

This abnormal stress can be materially reduced or eliminated by my present invention which involves the mounting of the arm pivotally at both ends so that if the line should break the arm will pivot about its longitudinal horizontal axis in accordance with the direction of and the increased stress in the arm.

My invention resides in the combination and arrangement of the parts shown in the accompanying drawings and described in this specification and, as particularly pointed out in the claims.

In the drawings:—

In the preferred embodiment of my invention I employ a plurality of spaced masts or towers 1 which may be of wood or steel. Pivotally mounted between the masts 1 are one or more cross arms 2 which may be either of wood or structural steel.

Figure 1:
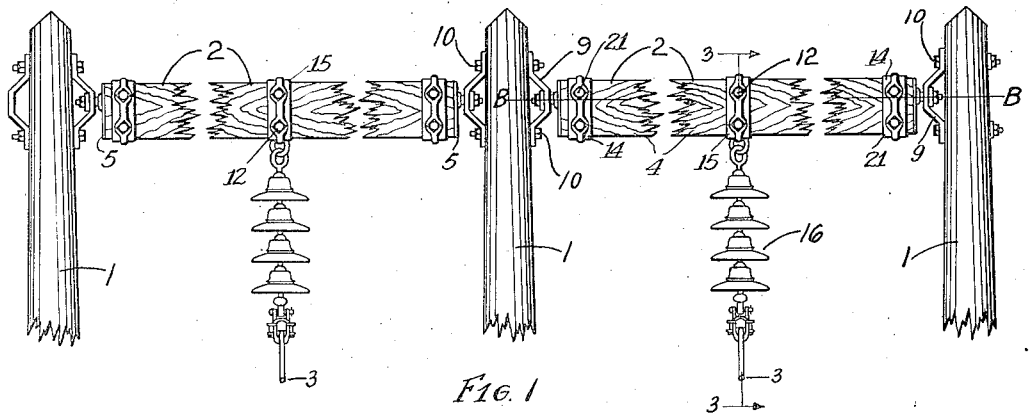
Fig. 1 is a side view in elevation looking in a longitudinal direction of the line showing a structure whereby two conductors are supported from pivotally mounted arms.
Figure 2:
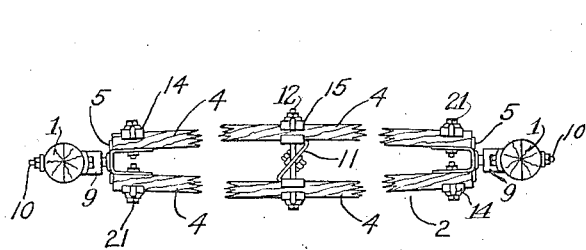
Fig. 2 is a top view of Fig. 1 showing two of the masts and one arm.

I have shown in Fig. 1 a construction suitable for two lines constituting a single phase circuit but provision for a third line may be easily provided for which would constitute a three-phase line by the addition of a third mast and arm and I have indicated at the lefthand side of the lefthand mast 1 a fitting whereby the construction may be extended.

I have shown the arms 2 as made of two longitudinal members 4 held together at their opposite ends by means of fittings 5. Secured to the fittings 5 are pivotal studs 6 (see Figs. 6 and 7) provided with flanges and nuts 7 and 8 whereby the studs are detachably secured to the fittings 5 and to the supports 9 which in turn are secured to the masts 1 by means of the bolts 10.

Adjacent the center of the arm is a Z-shaped brace or spreader 11 which has a tendency to spread the arms at the center thus tending to stiffen the arm against bending in a horizontal direction. The spreaders are secured to the arms by means of the bolts 12 passing through the apertures 13. On the outer faces of the arms at the end and center fittings are metal plates 14 and 15 which tend to prevent the arms splitting and the nuts from embedding in the arms of wood.

Figure 3:
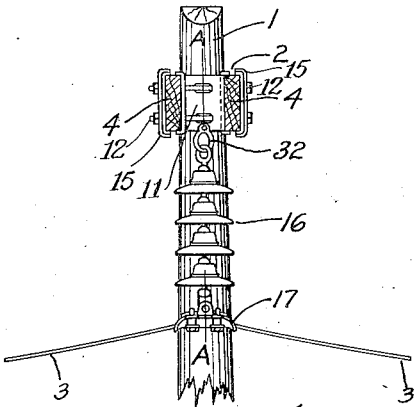
Fig. 3 is a vertical longitudinal view in partial section on the line 3—3 of Fig. 1 under normal conditions.

In Fig. 3 the relation of the parts are shown under normal condition, that is, the axis A—A of the insulator string 16 and arm 2 and also the load are vertical due to the span stress on each side of the supporting clamp 17 being balanced.

Figure 4:
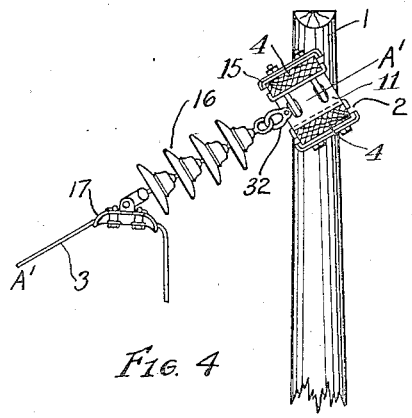
Fig. 4 is a view similar to Fig. 3 showing the result due to the line breaking at one side of the arm.
Figure 5:
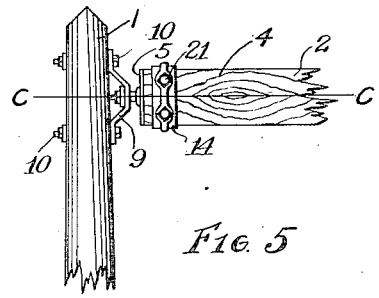
Fig. 5 shows a mounting of the cross arm to the mast to pivot about its central longitudinal axis.

In Fig. 4 is shown the relation of the parts when the span is broken at one side of the arm. The tendency is for the line to "run" and the insulators 16 to follow with an increased pull on the arm in one direction, the axis A'—A' taking the oblique position shown and the arm 2 pivoting upon its axis B—B to the position shown, thus relieving the parts of torsional stress.

In place of having two or more cross arms mounted in tandem as shown in Fig. 1 the arms may be placed one above the other and between two masts providing the spacing between the arms and conductors is such as to permit of a practical construction of this nature and whether it is so or not will depend to a large degree upon the voltage employed on the line.

Figure 6:
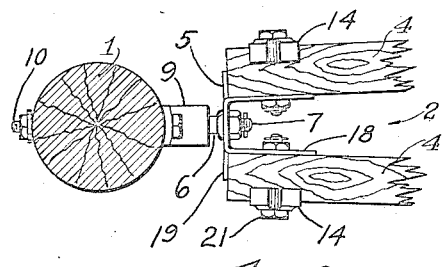
Fig. 6 is an enlarged top view of the construction showing the pivotal connection between the arm and the mast in Fig. 1.
Figure 7:
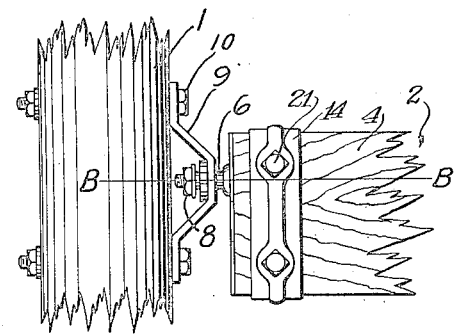
Fig. 7 is an enlarged side view showing the construction of the pivotal connection between the arm and mast of Fig. 1. The pivotal mounting in this case is on the line B—B above the center of gravity of the arm.
Figures 12, 13:
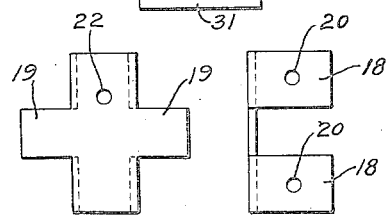
Figs. 12 and 13 are end and side views respectively of the end fitting shown in Fig. 6 and shows the top view of the end fittings.

The end fittings shown in Fig. 6 and in further detail in Figs. 12 and 13 are formed preferably from steel plate cut and pressed to shape and the stud 6 may be secured thereto by means of the nuts 7 or the stud may be formed as an integral part by welding to the plate. The end fitting is provided with the inwardly projecting and spaced lugs 18 and the transversely projecting lugs 19. The lugs 18 are pierced at 20 to permit the use of the bolts and nuts 21 in securing the plate to the arms. The stud 6 may be passed through the opening 22.

The studs 6 are mounted in a fitting 9 secured to the mast 1 by means of bolts 10 and the fitting 9 is provided with an opening through which the stud 6 projects. This construction permits the arm to pivot upon the studs 6.

The end plates for the fittings 5 may be provided with a modified form of stud 23 which is secured to the end plate by means of a nut 24 and the free end of the stud provided with an enlarged head arranged to fit into a socket member 25 which is secured to the mast 1 by means of bolts 26.

The member 25 has a recessed dome-shaped portion 27 with a T-shaped opening 28 through which the headed end of the stud 23 is passed. This construction forms what might be termed a ball and socket joint permitting limited universal movement. The member 23 may move longitudinally relative to the member 25 thus preventing the members binding.

Figure 8:
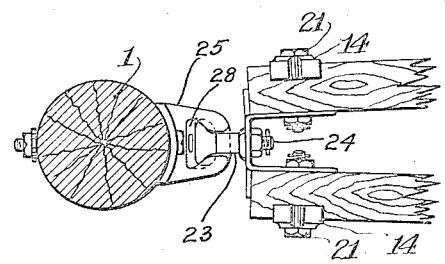
Figs. 8 and 9 show top and side views respectively of a universal type of pivotal connection between the arm and the mast.
Figure 9:
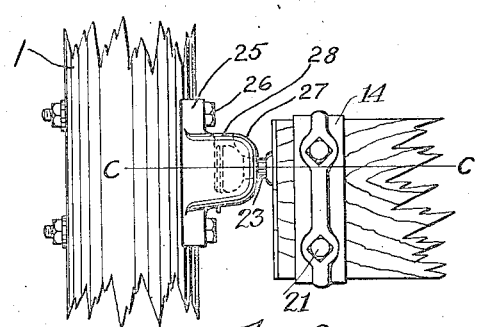
Figure 10:
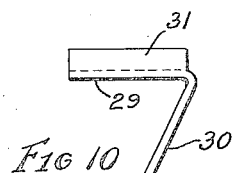
Fig. 10 is a top view of the center brace or spreader between the arms shown in Fig. 2.
Figure 11:
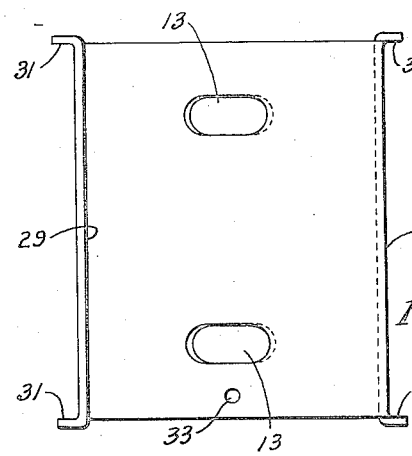
Fig. 11 is a face view of the brace or spreader shown in Fig. 10.

Both the construction shown in Figs. 6 and 8 will prevent the supports 1 from spreading relative to each other and to the arms 2.

The brace or spreader 11 is formed preferably from sheet material of Z-shaped formation provided with legs 29 connected by the obliquely disposed portion 30 which is provided with the apertures 13 through which pass the securing bolts 12. The legs 29 are provided with the upper and lower projecting flanges 31.

The insulators 16 may be of any construction to meet the requirements and are shown as of the suspension type and secured to the center brace or spreader 11 by means of the fitting 32, which may be linked therewith through the opening 33.

It will be apparent that the arms as shown and described will pivot about their longitudinal horizontal axes B—B and C—C thus permitting the arm to pivot to such angular position as to automatically maintain its normally vertical axes substantially in the direction of the greatest force placed upon the arm at all times, especially should one span break as shown in Fig. 4 or the line become unbalanced. This permits the force applied to the cross arm to extend in the direction in which the arm is best fitted to oppose the greatest bending moment as it will be noted that the members 4 of the arms have their greatest cross sectional dimension in line with the axis of the insulator string or direction of the load.

Modifications will suggest themselves to those skilled in the art, therefore, I wish to be limited only by my claims.

I claim:—

1. A crossarm comprising a pair of rigid members of insulating material spaced apart, a U-shaped fitting at each end interposed between the members and holding the ends of the members in fixed relation, means securing the fittings to the members, a stud projecting from the bight of each fitting and away from the arm and having an enlarged free end, a socket member for each stud arranged for attachment to a support and adapted to receive the enlarged free end of the stud, the socket and stud forming a ball and socket joint permitting universal movement of the arm relative to the support and preventing separation of the fittings and socket members.

2. A transmission line comprising in combination a plurality of spaced upright supports, a rigid arm of less length than the distance between the supports comprising a pair of rigid members of insulating material spaced apart, a U-shaped fitting at each end and holding the ends of the members in fixed relation, means securing the fittings to the members, a stud projecting from the bight of each fitting and away from the members and having an enlarged free end, each stud provided with a socket attached to the adjacent support and adapted to receive the enlarged free end of the stud, the socket and stud forming a ball and socket joint permitting universal movement of the arm relative to the support and preventing separation of the fittings and socket members.

3. A cross-arm comprising a pair of spaced members of insulating material, a holding fitting at each end of the pair of spaced members to hold the ends of the members in predetermined relation, each holding fitting having associated therewith a supporting fitting for attachment to an upright support, one of the fittings at each end of the members provided with a projecting stud having an enlarged head at its free end and the associated fitting having a socket in which is seated the enlarged head, the fittings forming a universal joint and preventing the separation of the associated fittings.

MARTIN M. KENNEALLY.